Oct. 14, 1969    M. GENSER    3,471,947
TEACHING EQUIPMENT DESK
Filed June 23, 1966
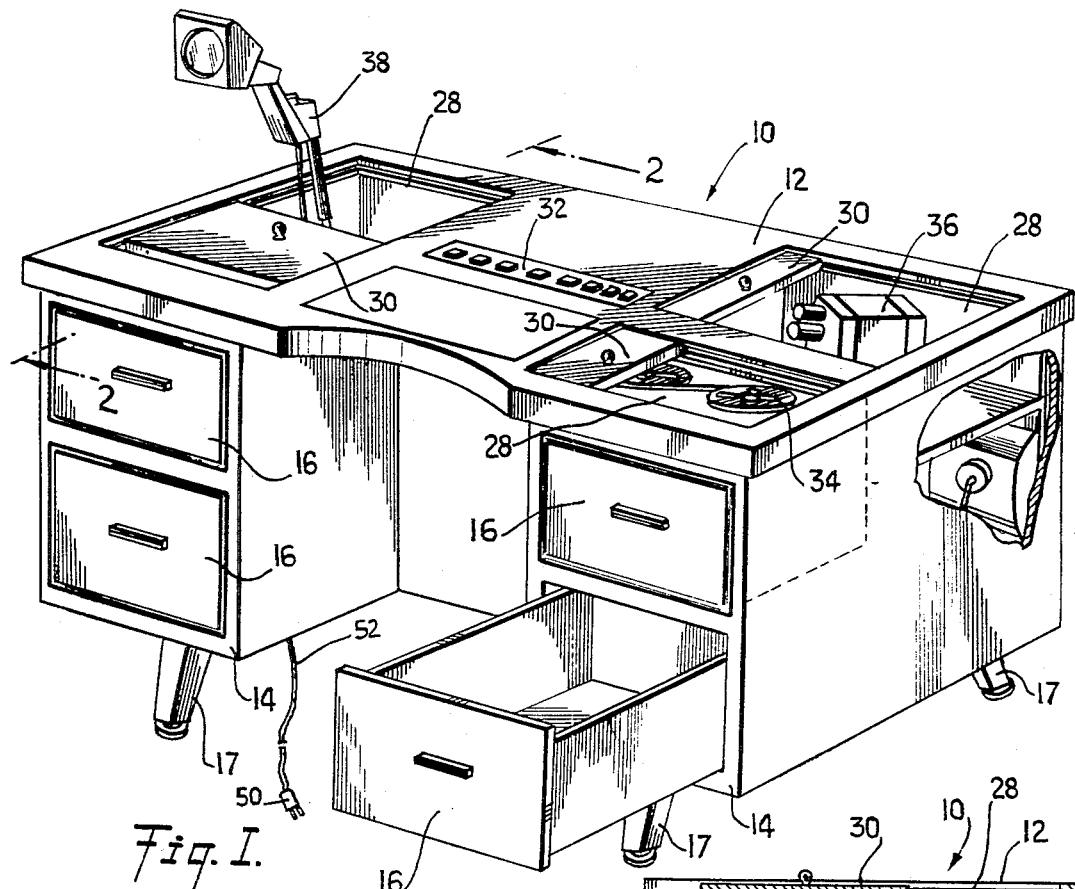
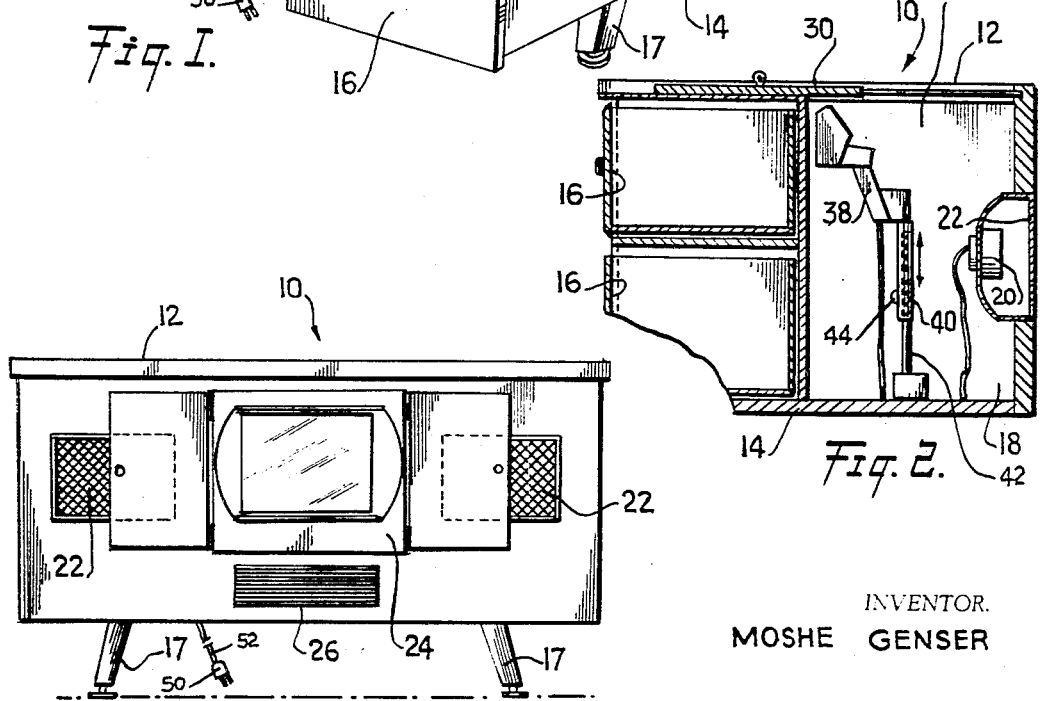
INVENTOR.
MOSHE GENSER

United States Patent Office 3,471,947
Patented Oct. 14, 1969

3,471,947
TEACHING EQUIPMENT DESK
Moshe Genser, 138—10 Franklin Ave.,
Flushing, N.Y. 11355
Filed June 23, 1966, Ser. No. 559,928
Int. Cl. A47b *41/00;* H04r *9/06;* H04b *1/06, 1/20;*
H04n *5/44*
U.S. Cl. 35—60                             3 Claims

ABSTRACT OF THE DISCLOSURE

A desk having wells containing teaching equipment which is accessible through slidable access panels in the top of the desk.

---

My invention is directed to a desk containing teaching equipment.

Accordingly, it is an object of my invention to provide a new and improved desk containing teaching equipment which can be used not only as a conventional desk, but also contains for accessible use a television receiver, an image projector, a motion picture projector, a tape recorder and a stereo radio-phonograph.

Another object is to provide a new and improved desk containing teaching equipment of the character indicated and also provided with a set of controls permitting a teacher or other person while seated at the desk to selectively operate one or more of the different pieces of equipment contained therein.

Still another object is to provide a new and improved desk containing teaching equipment of the character indicated which is compact and can be moved easily from place to place.

All of the foregoing and still further objects and advantages of my invention will now be explained with reference both to this specification and to the accompanying drawings wherein:

FIG. 1 is a perspective view of a desk containing teaching equipment in accordance with my invention;

FIG. 2 is a side cross sectional view of the desk of FIG. 1 as taken along line 2—2 in FIG. 1; and FIG. 3 is a front view of the desk of FIG. 1.

Referring now to FIGS. 1-3, there is shown a desk 10 having a horizontal flat top 12 supported by first and second spaced apart cabinets 14 each containing two vertically spaced drawers 16 at the rear. Each cabinet is supported by two spaced apart legs 17. The front of each cabinet takes the form of a hollow chamber 18 having a loudspeaker 20 mounted therein and concealed by speaker cloth 22. The space between the fronts of the cabinets contains a television receiver 24 and below the receiver 24 is a stereo radio receiver and record player apparatus 26. The front can also have doors which when closed conceal the cloth 22, the receiver 24 and the apparatus 26.

The top 12 contains a plurality of wells 28 each having a sliding top horizontal panel 30 which can be slid back and forth to open and close same. In addition, the center of the desk carries a control panel 32 accessible by another sliding panel.

One well contains a tape recorder 34; a second well contains a motion picture projector 36; the third well contains an overhead projector 38. Projector 38 has an image receiving portion containing a screen upon which transparencies are placed and project an image received by the head. Each projector is mounted on a vertical telescopic support 40 that can be raised or lowered mechanically or manually along support pole 42 to raise the projector out of its well for use or to lower same into the well when out of use. Support 40 has a set screw 44.

The drawers 16 can be used to store tape, film and the like.

In use with all doors closed, the desk can be used in conventional manner. When one or more wells are opened and the control panel is used, the equipment in the wells can be used as desired. Further the front doors can be opened to permit use of the television and stereo equipment, also operable from the control panel. Electric power can be supplied to the desk via plug 50 and cord 52. Thereafter, the power can be supplied to individual units by conventional means (not shown).

While I have described my invention with particular reference to the drawings, my protection is to be limited only by the terms of the claims which follow.

Having thus described my invention, I claim as new and desire to secure by Letters Patent:

1. A desk containing teaching equipment comprising first and second spaced apart cabinets, each cabinet having a rear section with a plurality of vertically spaced drawers and a front section having a hollow chamber, first and second loudspeakers, each loudspeaker being positioned in a corresponding chamber, a flat horizontal top overlying said cabinets, said cabinets containing a plurality of wells, and a like plurality of separate teaching apparatus, each apparatus being positioned in a corresponding well, each well having a horizontal slidable access panel mounted in said top; and television and radio-phonograph equipment disposed between the front sections of said cabinets.

2. A desk as set forth in claim 1 wherein said apparatus includes a tape recorder, a motion picture projector and an image projector.

3. A desk as set forth in claim 2 wherein said top contains a control panel for selective operation of said equipment and apparatus.

References Cited

UNITED STATES PATENTS

| 764,832 | 7/1904 | Valentine | 312—194 X |
|---|---|---|---|
| 2,664,331 | 12/1953 | Glotfelter | 312—194 |
| 3,231,321 | 1/1966 | Barney | 312—7 |
| 3,245,741 | 4/1966 | Bartlett | 312—196 X |
| D. 186,894 | 12/1959 | Henrikson | D33—7 |

OTHER REFERENCES

A. S. Hayes, "Language Laboratory Facilities," OE–21024 Bulletin 1963, No. 37, Department of HEW, Office of Education, Published 1963, p. 2 only.

ENGENE R. CAPOZIO, Primary Examiner

M. S. SKOGQUIST, Assistant Examiner

U.S. Cl. X.R.

312—196